(12) United States Patent
Hendricks et al.

(10) Patent No.: US 6,343,889 B1
(45) Date of Patent: Feb. 5, 2002

(54) SPLIT-SOCKET BALL JOINT

(75) Inventors: Chuck Hendricks, Tillsonburg; Joe Volkaert, St. Thomas, both of (CA)

(73) Assignee: Odyssey X-Treme Technologies, Inc., Tillsonburg (CA)

(*) Notice: Subject to any disclaimer, the term of this patent is extended or adjusted under 35 U.S.C. 154(b) by 0 days.

(21) Appl. No.: 09/397,587

(22) Filed: Sep. 16, 1999

Related U.S. Application Data
(60) Provisional application No. 60/102,127, filed on Sep. 28, 1998.

(51) Int. Cl.[7] .................................................. F16C 11/06
(52) U.S. Cl. ...................... 403/143; 403/127; 403/135
(58) Field of Search ................................. 403/143, 142, 403/141, 122, 135, 127, 137; 29/898.043, 898.048; 280/124.134; 384/495, 496, 497, 498, 508, 203, 206, 209

(56) References Cited

U.S. PATENT DOCUMENTS

| | | | | |
|---|---|---|---|---|
| 2,037,786 A | * | 4/1936 | Hufferd | 403/127 |
| 2,259,881 A | * | 10/1941 | Foley | 384/497 |
| 2,797,930 A | * | 7/1957 | Booth | 403/127 X |
| 2,865,688 A | * | 12/1958 | Lemont, Jr. | 384/558 |
| 2,913,268 A | * | 11/1959 | Booth | 403/127 |
| 2,971,770 A | * | 2/1961 | Wagner | 403/127 X |
| 3,007,720 A | * | 11/1961 | Breitenstein | 403/122 X |
| 3,175,845 A | * | 3/1965 | McClive | 403/127 X |
| 3,240,509 A | * | 3/1966 | Pierce | 403/127 X |
| 3,698,251 A | * | 10/1972 | Silvia | 384/496 X |
| 3,999,872 A | * | 12/1976 | Allison | 403/135 |
| 4,028,784 A | | 6/1977 | Allison | 29/149.5 |
| 4,725,159 A | | 2/1988 | Wood, Jr. | 403/133 |
| 4,725,195 A | | 2/1988 | Wiggs | 415/7 |
| 4,927,285 A | | 5/1990 | Kotz et al. | 403/133 |
| 5,066,160 A | | 11/1991 | Wood | 403/140 |
| 5,163,772 A | | 11/1992 | Wood | 403/133 |
| 5,492,427 A | | 2/1996 | Ersoy et al. | 403/77 |

* cited by examiner

*Primary Examiner*—Harry C. Kim
(74) *Attorney, Agent, or Firm*—Haynes and Boone, LLP

(57) ABSTRACT

This invention is directed to a split-socket ball joint comprising, a stud with a ball portion and attachment portion, an upper and lower socket capable of being attached to each other, and at least one race disposed with either the upper or lower socket, wherein the race comprises either ball bearings, roller bearings, or a combination thereof, and provides a spherical inner surface to mate with the ball portion of the stud. Furthermore, the split-socket ball joint may be fastened using a reversible fastening means, such as bolting the upper and lower sockets together. The ball joint of the present invention can be dismantled and is therefor repairable. The ball joint is useful for heavy duty applications.

5 Claims, 8 Drawing Sheets

SPLIT-SOCKET BALL JOINT

This application claims priority from U.S. provisional application 60/102,127, filed Sep. 28, 1998.

The present invention relates to a ball joint assembly. More specifically, this invention relates to a split-socket ball joint, wherein each socket comprises a race configured to mate with the ball portion of a stud.

BACKGROUND OF THE INVENTION

Ball joint assemblies, typically manufactured for automotive use, comprise stamped metal housings (e.g. U.S. Pat. Nos. 5,163,772; 5,066,160; 5,492,427). The edge of the joining surfaces may be beaded to close off the assembly in order to increase strength and ensure a seal to limit lubricant leakage, or the lower end of the ball joint socket is deformed to encase the ball portion of the stud and preload the bearing (e.g. U.S. Pat. No. 5,163,722). It is not possible to disassemble these types of ball joints once they are deformed and preloaded. Furthermore, such ball joints may comprise bearing shells that are disposed between the ball portion of the stud and the socket wall. For example, in U.S. Pat. No. 5,492,427 there is disclosed a plastic bearing shell laterally disposed between the ball portion of the stud and socket wall. However, in rough or heavy use, the bearing shell becomes pitted and with repeated shock breaks down. These types of ball joints are suitable for light duty use, however, they are not suitable for off-road, or repeated heavy duty use.

Elastomeric bearings encapsulating the end of a stud are disclosed in U.S. Pat. No. 5,163,772; 5,4,725,159 or 4,927,285. The bearing is elastically deformed and fits into an open end of a socket thereby taking the shape of the socket, and can be preloaded upon deformation of the socket as described above. This type of ball joint design is suitable for light duty use.

U.S. Pat. No. 4,028,784 discloses a ball joint assembly comprising two housings for use in a steering assembly. These housing are held together by butt welding under a compressive load in order to preload the ball joint assembly. The compressive load fractures frangible annular bushing-like bearings within the ball joint in order to produce a plurality of self-aligning bearing pieces each comprising a quarter of the bearing surface. The bronze bushing-like bearings are generally annular in configuration with a spherical inner surface to mate with the ball portion of the stud. The annular bushing-like bearings are fit within the upper and lower sockets. Again, such a design does not permit for any repair or replacement of component parts as the housing halves are permanently welded. Furthermore, the annular bearings, while helping to reduce the friction between the stud and socket, are suitable for light duty use only.

There is a need of a ball joint assembly which can be used for heavy duty applications that effectively provides for reduced friction between the ball portion of the stud and the socket. Furthermore, there is a need for a ball joint assembly that optionally permits easy repair and replacement of component parts.

The present invention is directed to a ball joint assembly that includes a stud, upper and lower sockets each capable of receiving a bearing race configured to matingly fit the ball portion of the stud. The upper and lower sockets are optionally reversibly fastened together to permit for repair of the ball joint assembly.

SUMMARY OF THE INVENTION

The present invention relates to a ball joint assembly. More specifically, this invention relates to a split-socket ball joint, wherein each socket comprises a race configured to mate with the ball portion of a stud.

According to the present invention there is provided a split-socket ball joint comprising, a stud with a ball portion and attachment portion, an upper and lower socket capable of being attached by a suitable fastening means, and at least one race disposed with said upper or lower socket, wherein said at least one race comprises either ball bearings, roller bearings, or a combination thereof, said at least one race providing a spherical inner surface to mate with said ball portion of said stud. Preferably, said suitable fastening means is a reversible fastening means, and more preferably comprises bolting said upper and lower sockets together. Furthermore, said race comprises roller bearings.

The present invention also provides for a split-socket ball joint as defined above, wherein at least one of said upper or lower socket is slightly hollowed thereby providing a preload to the ball joint when attached by said suitable fastening means.

This invention is also directed to a split-socket ball joint as defined above, wherein said suitable fastening means is welding.

The present invention also includes a split-socket ball joint as defined above, wherein either the upper or lower socket further comprise a lip that matingly fits with a recess on the corresponding lower or upper socket, respectively.

The present invention includes a split-socket ball joint wherein said upper and lower sockets are machined from SAE 4340 heat treated material, or said upper and lower sockets are forged.

This invention is also directed a split-socket ball joint wherein said stud is machined from SAE 8620 material.

The present invention also embraces a split-socket ball joint comprising:
  a stud with a ball portion and attachment portion, said stud is machined from SAE 8620 material;
  an upper and lower socket capable of being bolted together, said sockets machined from SAE 4340 heat treated material; and
  two races disposed with said upper and lower sockets, wherein said race comprises roller bearings and provides a spherical inner surface to mate with said ball portion of said stud;
  wherein at least one of said upper or lower socket is slightly hollowed thereby providing a preload to the ball joint when attached by said suitable fastening means; and
  wherein either the upper or lower socket further comprise a lip that matingly fits with a recess on the corresponding lower or upper socket, respectively.

The present invention is directed to ball joints comprised of a stud with a ball portion, two sockets within which is disposed at least one race fitted with either ball, roller or a combination of ball and roller bearings. The upper and lower sockets of the ball joint of this invention may be reversibly attached thereby permitting repair of the ball joint. Prior art ball joints are not serviceable in this manner. Furthermore, the bearing material of the present invention is much more resilient than the plastic bearing shells, or elastomeric materials used within prior art ball joints and ensures the free movement of the ball portion of the stud within the socket assembly, under load conditions. The present invention provides for a ball joint capable of withstanding appreciable loads and is suitable for rugged, off-road vehicle use.

BRIEF DESCRIPTION OF THE DRAWINGS

These and other features of the invention will become more apparent from the following description in which reference is made to the appended drawings wherein.

DESCRIPTION OF PREFERRED EMBODIMENT

Figure 1:
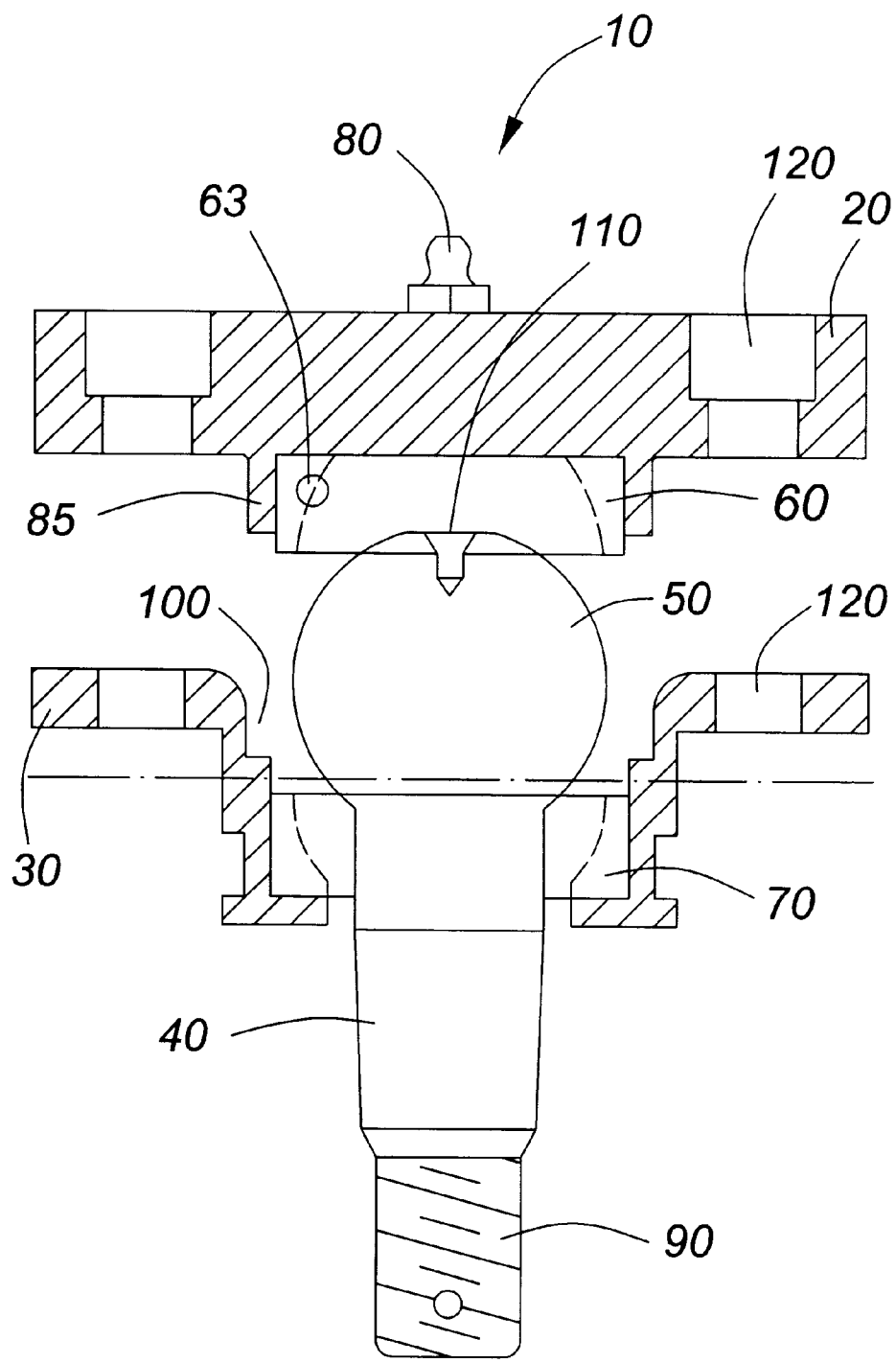
FIGS. 1 to 4 show various aspects of an embodiment of the present invention.
Figure 2A:
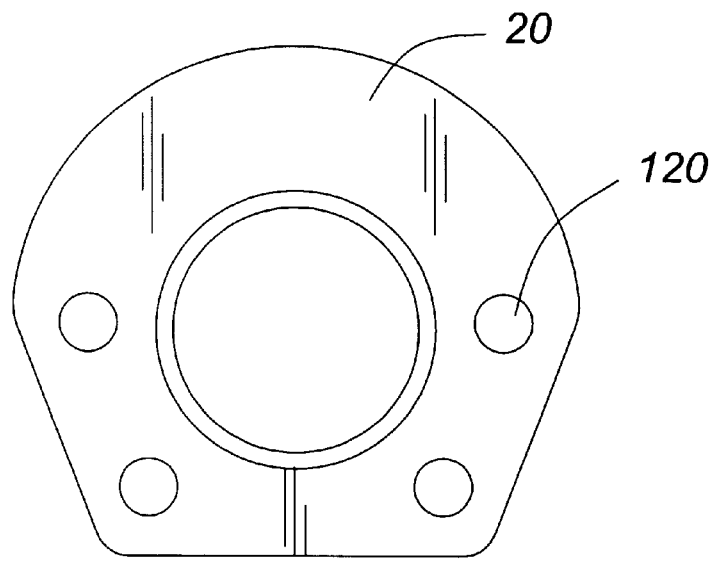
Figure 2B:
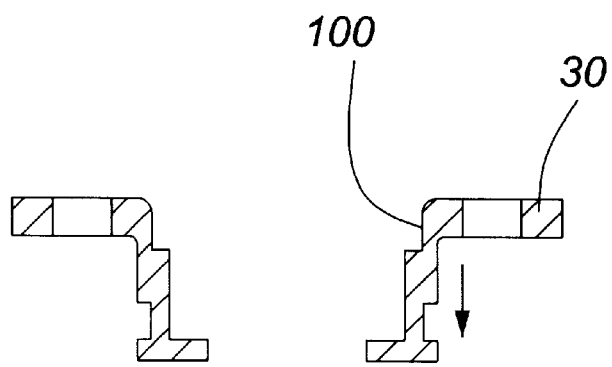
Figure 3A:
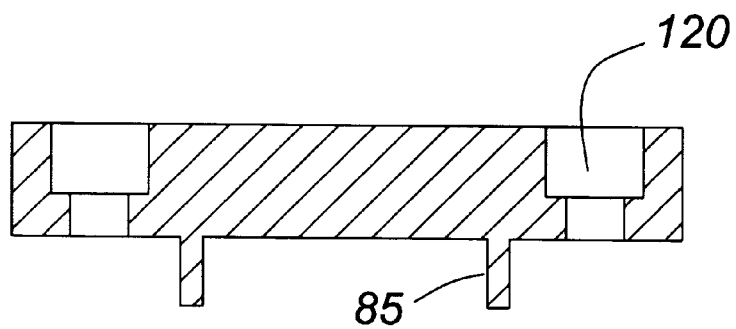
Figure 3B:
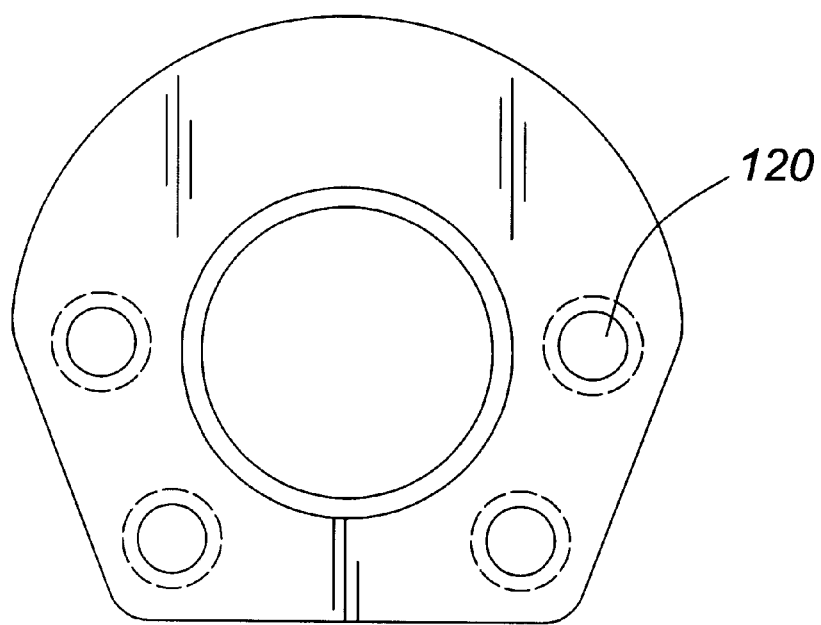
Figure 4:
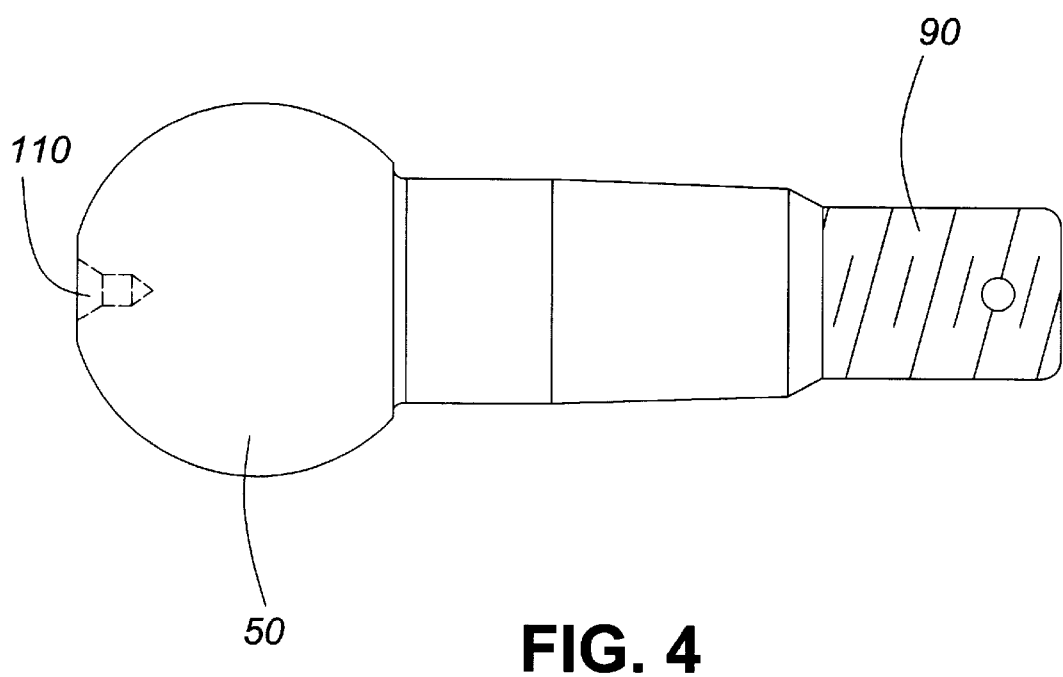

The present invention relates to a ball joint assembly. More specifically, this invention relates to a split-socket ball joint, wherein each socket comprises a race configured to mate with the ball portion of a stud.

With reference to the figures of the present invention, there is provided a ball joint assembly (10) comprising an upper socket (20), a lower socket (30), a stud (40) with a ball portion (50), an upper race (60), and a lower race (70) with each of the races adapted to matingly fit the ball portion of the stud.

The stud (40) is preferably made of SAE 8620 material, or similar grade which is cold formed or machined to the desired dimensions, however this material is not to be considered limiting in any manner. Other grade of steel that may be used for the stud present include SAE 8115, 8615 or 8640, or other steel of like hardness. The stud is provided with a ball portion (50) at one end, and an attachment portion (90) that extends out from the ball joint assembly for engagement with a desired item such as, but not limited to, a tie rod. The item may be engaged with the attachment portion of the ball joint through any suitable means including, but not limited to, a threaded portion capable of receiving a bolt, a clevis or cotter pin fitting through a drilled hole within the attachment portion, C-clip registering within a suitable recess, or a combination thereof. The ball portion of the stud may comprise a one or more recesses appropriately located adjacent to the lubricating nipple (80).

By socket assembly it is meant a socket comprising both the upper (20) and lower (30) sockets. The sockets are preferably milled from SAE 4340, heat treated (pre-hardened) steel, however, other steel of similar hardness may also be used. Even though it is preferred that the socket assemblies are machined from billet material, it is also contemplated, and considered within the scope of the present invention, that the sockets may be forged, or prepared using other means as known within the art. Disposed within the upper or lower socket as required, is optionally a lubricating nipple (80) used to lubricate the ball joint assembly. One half of the socket assembly, either the upper or lower socket, comprises a protruding lip (85; located on the upper socket in FIG. 1, or lower socket in FIG. 5) that matingly fits within an appropriate recess (100) present with the other socket. The socket assembly optionally comprises holes (120) within both the upper and lower sockets, in alignment thereto, and adapted for reversibly fastening the upper and lower sockets together, for example, but not limited to, using bolts and nuts of appropriate hardness that may be fastened to a desired torque. With this embodiment, the ball joint is repairable as the two socket halves may be disassembled if needed. However, it is within the scope of the present invention that the socket assembly may be fastened together by other means including welding. In either case, it is preferred that at least one inner surface of either the upper or lower socket is hollowed slightly, so that when assembled and fastened together with the corresponding socket, an appropriate preload is provided to the ball joint assembly.

Figure 5:
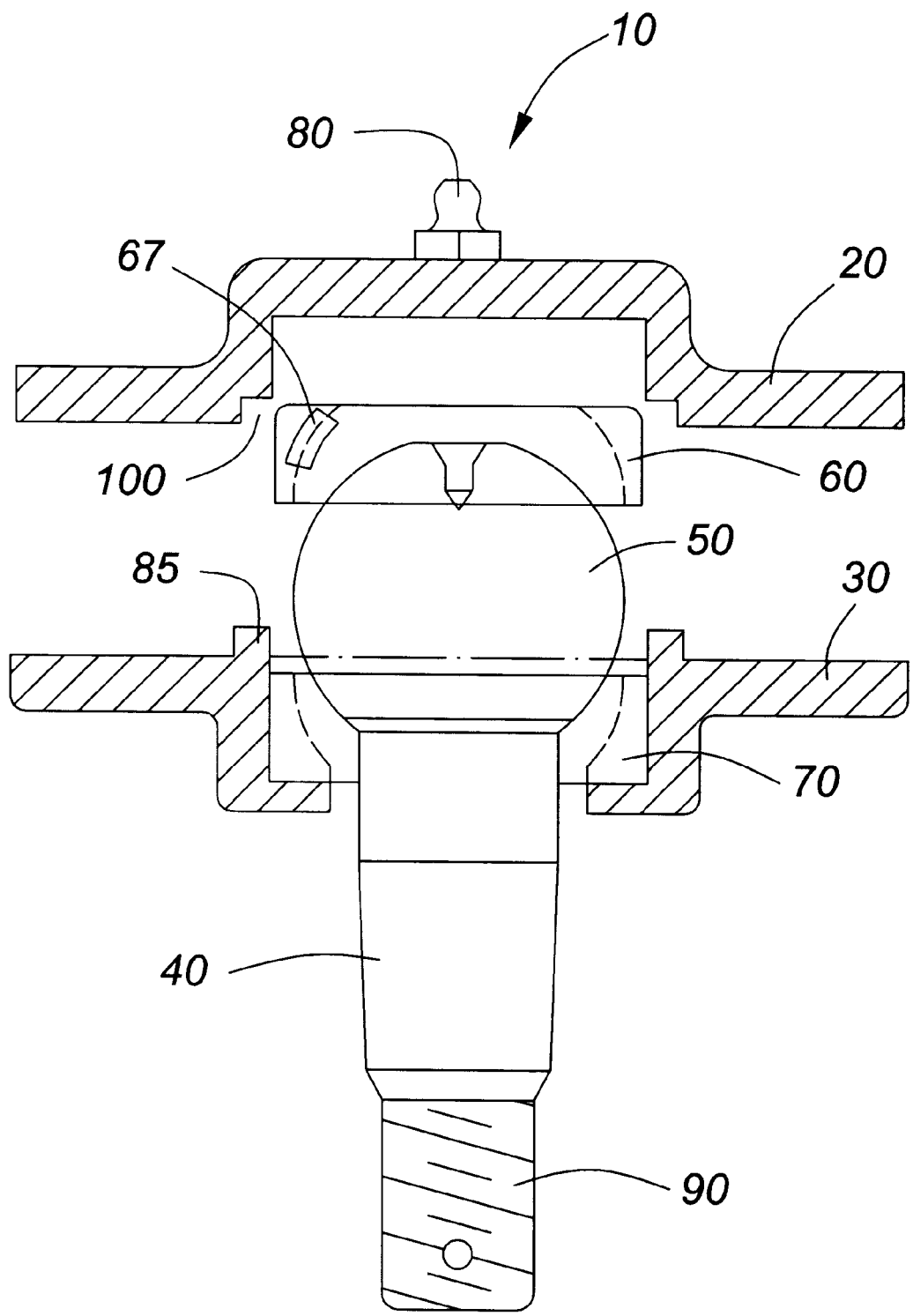
FIGS. 5 to 8 show various aspects of another embodiment of the present invention.
Figure 6A:
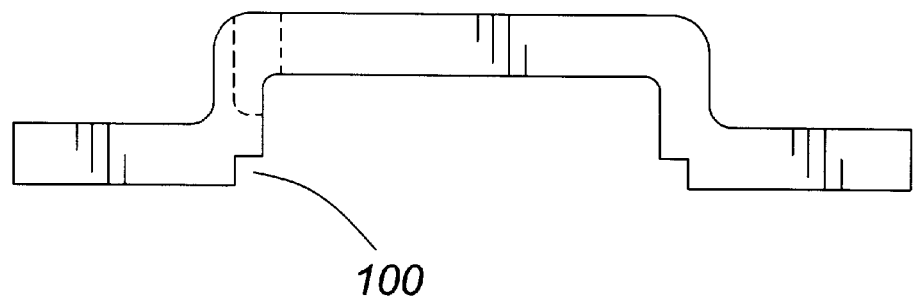
Figure 6B:
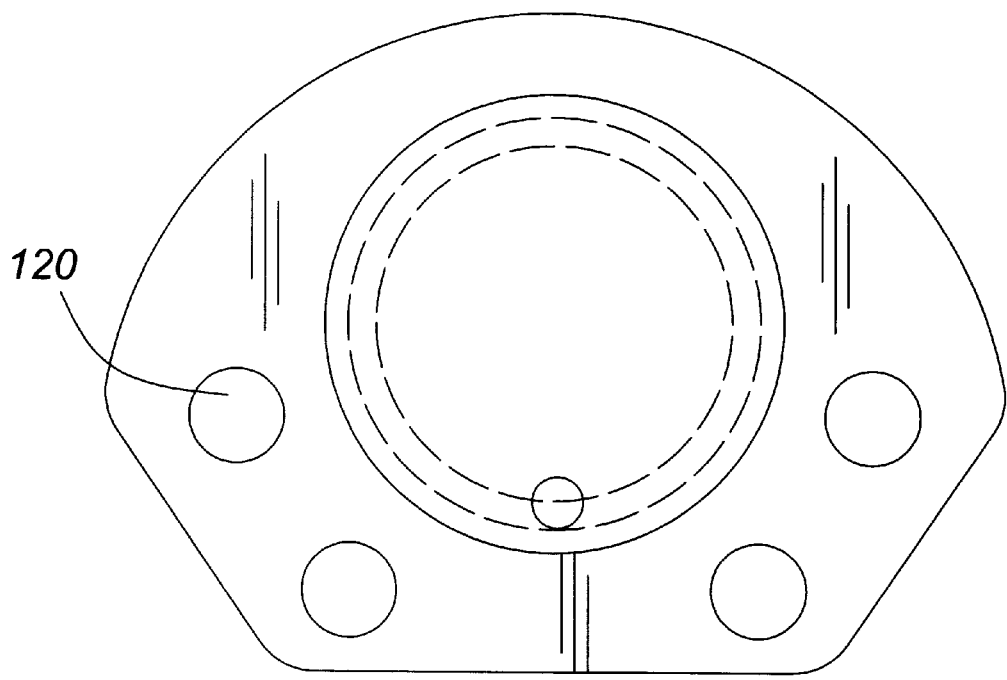
Figure 7A:
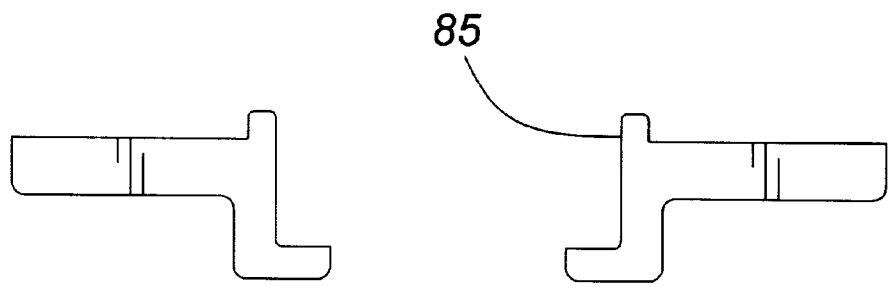
Figure 7B:
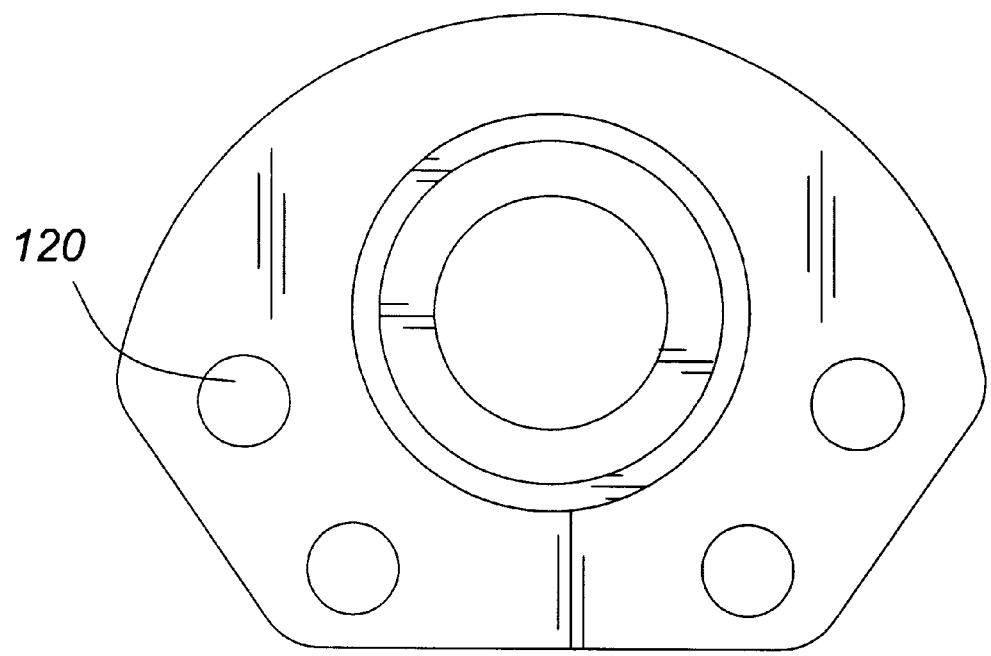
Figure 8:
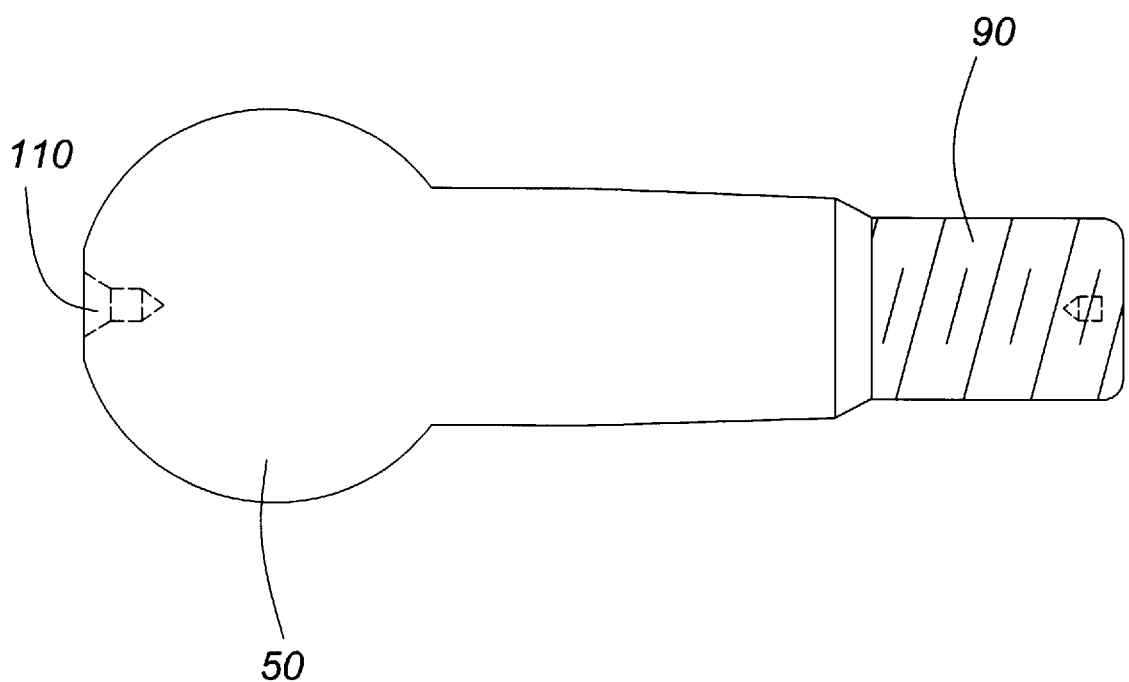

At least one race (60 and 70) fits within either or both the lower and upper sockets. By race it is meant either of the concentric pair of steel rings of a ball (e.g. 63; FIG. 1) or roller bearing (e.g. 67; FIG. 5). The race may comprise any commercially available bearings (e.g. Roller bearing Co. of America, N.J), and be suitably configured to fit within either the upper or lower socket. The race is configured to provide a spherical inner surface to mate with the ball portion (50) of the stud. The bearing may comprise either ball or roller bearings in order to ensure free movement of the stud under load. However, it is also considered within the scope of the present invention that at least one annular bushing, comprised of appropriate resilient material, may also be used if desired in place of a race. If it is desired that only one race is used, the other surface may comprise a bushing material as described above.

All publications are incorporated by reference.

The present invention has been described with regard to preferred embodiments. However, it will be obvious to persons skilled in the art that a number of variations and modifications can be made without departing from the scope of the invention as described herein.

The embodiments of the invention in which an exclusive property of privilege is claimed are defined as follows:

1. A split-socket ball joint comprising:
   a stud with a ball portion and attachment portion;
   an upper and lower socket capable of being bolted together; and
   two races disposed within said upper and lower sockets, respectively, wherein each race comprises roller bearings, ball bearings, or a combination thereof, and provides a spherical inner surface to mate with said ball portion of said stud;
   wherein at least one of said upper or lower socket is slightly hollowed thereby providing a preload to the ball joint when bolted together; and
   wherein either said upper or lower socket further comprise a lip that matingly fits with a recess on the corresponding lower or upper socket, respectively.

2. The split-socket ball joint of claim 1 wherein each of said two races comprise ball bearings.

3. The split-socket ball joint of claim 1 wherein each of said two races comprise roller bearings.

4. The split-socket ball joint of claim 1 wherein either said upper, lower or both sockets comprise a lubricating nipple.

5. A split-socket ball joint comprising:
   a stud with a ball portion and attachment portion, said stud is machined from SAE 8620 material;
   an upper and lower socket capable of being bolted together, said sockets machined from SAE 4340 heat treated material; and
   two races disposed within said upper and lower sockets, wherein said race comprises roller bearings and provides a spherical inner surface to mate with said ball portion of said stud;
   wherein at least one of said upper or lower socket is slightly hollowed thereby providing a preload to the ball joint when bolted together; and
   wherein either said upper or lower socket further comprise a lip that matingly fits with a recess on the corresponding lower or upper socket, respectively.

\* \* \* \* \*